United States Patent [19]
Ohashi et al.

[11] 3,832,638
[45] Aug. 27, 1974

[54] OUTPUT CONTROL DEVICE OF FM RECEIVER

[75] Inventors: Shin-Ichi Ohashi; Isao Fukushima, both of Toyokawa, Japan

[73] Assignee: Hitachi Ltd., Tokyo, Japan

[22] Filed: Nov. 15, 1972

[21] Appl. No.: 306,682

[30] Foreign Application Priority Data

Nov. 15, 1971 Japan .............................. 46-90606

[52] U.S. Cl. ................................ 325/347, 329/132
[51] Int. Cl. ............................................ H03d 3/00
[58] Field of Search .................... 325/344, 347, 349; 329/109, 131, 132, 133, 134, 135, 136, 168, 178, 179

[56] References Cited

UNITED STATES PATENTS 2,969,459 1/1961 Hern .................................. 325/344
2,971,159 2/1961 Wilcox et al .................... 325/347 X
3,193,771 7/1965 Boatwright .......................... 329/134

*Primary Examiner*—Benedict V. Safourek
*Attorney, Agent, or Firm*—Craig & Antonelli

[57] ABSTRACT

An output control device for use in FM receivers comprises a low-pass filter for deriving only the d-c component from the output of a frequency discriminator, and a rectifier circuit for full-wave rectifying the output of the low-pass filter. The output of the rectifier circuit is applied to the amplitude limiter which is connected to the input circuit of the frequency discriminator, to cause the amplitude limiting level of the amplitude limiter to be changed, thereby minimizing the non-linear distortion developed in the frequency discriminator due to the deviation in the tuning of the FM receiver.

9 Claims, 7 Drawing Figures

FIG. 5
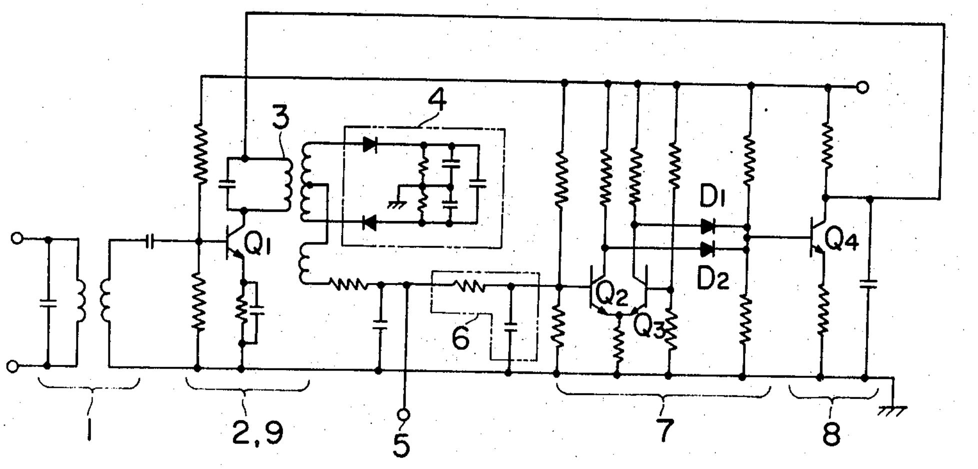
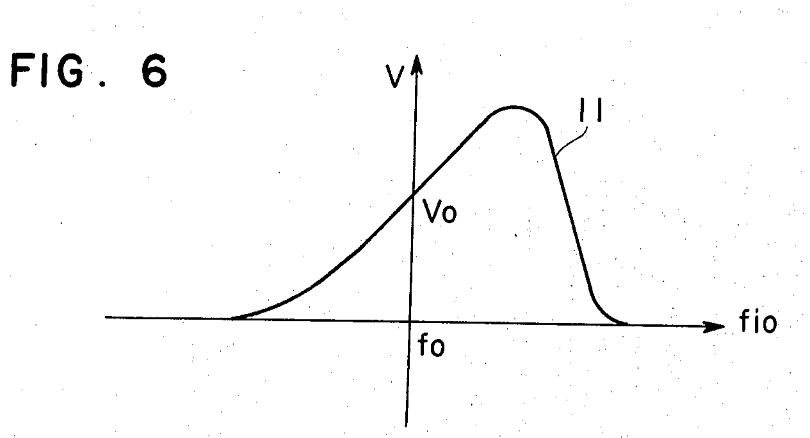
FIG. 7
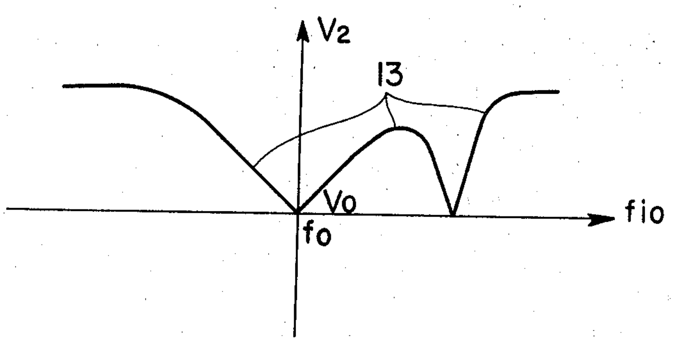

OUTPUT CONTROL DEVICE OF FM RECEIVER

BACKGROUND OF THE INVENTION

The present invention relates to output control devices of FM receivers and, more particularly, to output control devices having provisions to minimize the non-linear distortion of the frequency discriminator by decreasing the signal output of the frequency discriminator to be proportional to the value of the tuning deviation.

DESCRIPTION OF THE PRIOR ART

Generally known FM receivers operate in the following manner.

The signal from the ultrahigh-frequency amplifier which amplifies the given signal, and the signal from the local oscillator are applied to a mixer, and the carrier frequency is converted into an intermediate frequency. The intermediate frequency having its center frequency around 2 to 10MHz is amplified to a prescribed level by the intermediate-frequency amplifier and is then applied to an amplitude limiter. The signal with its envelop noise removed by the amplitude limiter is applied to the frequency discriminator through a coupling transformer. The frequency discriminator provides an output corresponding to the instantaneous frequency of the intermediate frequency to make an FM detection output voltage available at its output terminal. The output signal of the frequency discriminator is delivered by way of a low-pass filter and a low-frequency amplifier.

As is well known, an FM communication system has advantages over an AM communication system in that in the former system the S/N ratio is high and the distortion is low. This is why an FM system is widely used today in various systems including public broadcasting systems. This FM communication system, however, has problems such as those involving the FM receiver. One serious problem, as generally admitted, is the non-linear distortion caused in the frequency discriminator, i.e., the distortion caused by non-linearity involved in the instantaneous intermediate frequency versus detection output characteristic. More specifically, the discriminating characteristic of the frequency discriminator such as a Foster-Seeley frequency discriminator and ratio detector contains a non-linear portion, to result in a considerable amount of distortion if the tuning is improperly conducted. When the center frequency $f_{io}$ of the input intermediate frequency is coincident with the center frequency $f_o$ of the resonant intermediate frequency of the frequency discriminator, the frequency discriminator operates along the linear curve of its discriminating characteristic, with the result that the non-linear distortion is minimized. If, however, $f_{io}$ deviates from $f_o$, the frequency discriminator becomes operating in the non-linear portion of the discriminating characteristic. This introduces distortion into its output.

To prevent this non-linear distortion, $f_{io}$ should be made coincident with or tuned to $f_o$.

To do this, in the prior art, a meter is connected to the output circuit of the low-pass filter, and only the d-c component of the output of the frequency discriminator is indicated on the meter. Correct tuning is considered to be reached when the indication becomes equal to the center potential $V_o$ of the discriminator. With this output meter alone, correct tuning is not always monitored, because the indication $V_o$ will appear without input signal. To avoid such a problem, an input indicating meter is connected in parallel to the input circuit through the detector circuit.

In other words, the prior art device has necessitated two auxiliary meters — the meter for indicating the input signal intensity, in addition to the meter for indicating the center potential of the frequency discriminator. Because of this complexity, cumbersome procedures have been required for tuning, and the cost of the device has inevitably been high.

SUMMARY OF THE INVENTION

An object of the present invention is to provide an output control device for an FM receiver, which is simple in the construction and permits easy tuning.

Another object of the invention is to provide an output control device for an FM receiver, which can be manufactured at a low cost.

Briefly, the output control device of this invention is characterized in that it comprises a low pass filter for deriving the d-c component from the output of the frequency discriminator, and a full-wave rectifier circuit for rectifying the output of the filter, and the rectifier output is applied to the amplitude limiter connected to the input circuit of the frequency discriminator, to cause the amplitude limiting level to be changed in a reversely proportional manner by the use of the d-c output of said frequency discriminator.

BRIEF DESCRIPTION OF THE DRAWINGS

FIG. 5 is a circuit diagram showing an embodiment of the invention;

FIG. 6 is a diagram showing a typical characteristic of the conventional frequency discriminator, and FIG. 7 is a diagram showing the characteristic of the frequency discriminator used for the purpose of this invention.

DESCRIPTION OF THE PREFERRED EMBODIMENTS

Figure 1:
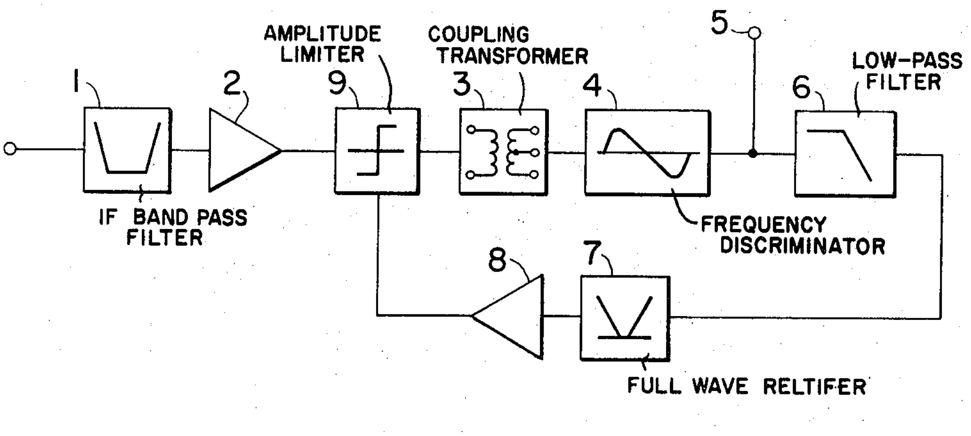
FIG. 1 is a schematic diagram illustrating the principle of the device of this invention.
Figure 2:
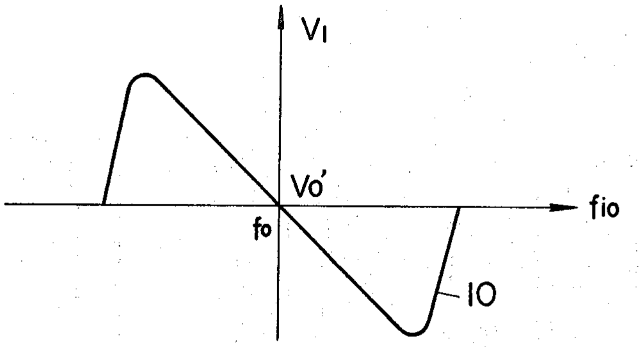
FIGS. 2 through 4 are diagrams showing the operations of the essential parts of the device as in FIG. 1.
Figure 3:
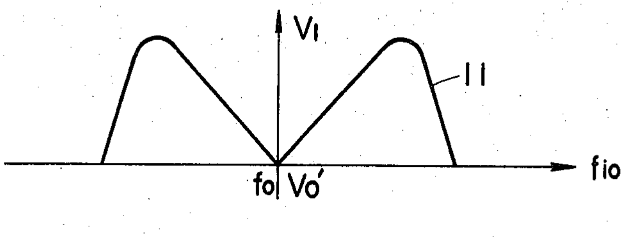
Figure 4:
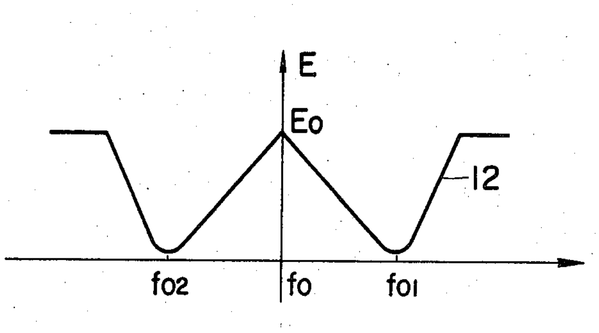

FIG. 1 illustrates in block form the principles of the invention, in which the numeral reference 1 denotes an intermediate frequency band-pass filter, 2 an intermediate frequency amplifier, 3 a coupling transformer, 4 a frequency discriminator, 5 an output terminal, 6 a low-pass filter, 7 a full-wave rectifier, 8 an amplifier, and 9 an amplitude limiter. FIGS. 2 through 4 show characteristics of the essential parts thereof in connection with FIG. 1. Referring to FIG. 1, the d-c component of the output of the frequency discriminator 4 is applied to the full-wave rectifier 7 by way of the low-pass filter 6. In FIG. 2, the wave-form 10 represents the input intermediate frequency center frequency $f_{io}$ versus the output voltage $V_1$ in the low-pass filter 6. The d-c output is full-wave-rectified on a reference voltage $V'_o$ by the rectifier 7. The rectified signal assumes the waveform 11 as in FIG. 3. This output is amplified by the amplifier 8 to a necessary level and then is applied to the amplitude limiter 9.

FIG. 4 shows the amplitude limiting level $E$ of the amplitude limiter 9 corresponding to the center frequency $f_{io}$. Assume that the amplitude limiting level is $E_o$ when $f_{io} = f_o$. Then the amplitude limiting level $E$ becomes smaller than $E_o$ as $f_{io}$ deviates from $f_o$. The size of the characteristic of the frequency discriminator is proportional to the amplitude limiting level $E$. Accordingly, the sensitivity $dV/df_{io}$, of the frequency discriminator becomes maximum when $E=E_o$, i.e., $f_{io}=f_o$. This sensitivity decreases as $f_{io}$ deviates from $f_o$ or $E$ becomes smaller than $E_o$. The device of the invention as in FIG. 1 operates on this principle. In other words, the device of this invention delivers the maximum demodulated output at its highest sensitivity under the condition $f_{io}=f_o$ where the non-linear distortion is minimum. The demodulated output decreases as $f_{io}$ deviates farther from $f_o$. Thus, by adjusting the receiver tuning so that the demodulated output is maximized, the receiver can be easily tuned to the point where the non-linear distortion is minimum.

In FIG. 4, the amplitude limiting level $E$ undergoes an increasing turn when $f_{io}$ becomes larger than $f_{01}$ or smaller than $f_{02}$. This appears to be a problem; in practice, however, this frequency band is outside the intermediate frequency band-pass filter where the input intermediate frequency signal is attenuated and the amplitude limiting level E is also attenuated to be far below the characteristic shown in FIG. 4.

FIG. 5 is a circuit diagram showing a device embodying this invention. Referring to FIG. 5, the numeral reference 1 denotes an intermediate frequency band-pass filter, 2 an intermediate frequency amplifier circuit comprising a transistor $Q_1$, which circuit operates also as an amplitude limiter 9, 3 a coupling transformer, 4 a ratio detector type frequency discriminator, 5 an output terminal, and 6 a low pass filter. The numeral 7 is a full-wave rectifier circuit comprising transistors $Q_2$ and $Q_3$, diodes $D_1$ and $D_2$. When the base voltage of transistor $Q_2$ changes in the positive direction with respect to the reference voltage $V'_o$, the collector voltage of transistor $Q_3$ increases in the positive direction to cause the diode $D_1$ to turn on. When the base voltage of transistor $Q_2$ changes in the negative direction with respect to the reference voltage $V'_o$, the collector voltage of transistor $Q_2$ increases in the positive direction to cause the diode $D_2$ to turn on. As a result, the base of transistor $Q_4$ is supplied with the full-wave rectified d-c output of the frequency discriminator 4. The numeral 8 denotes an amplifier using a transistor $Q_4$. The collector voltage of transistor $Q_4$ changes according to the full-wave rectified output as in FIG. 4. Hence, if this collector voltage is used as the power source on the collector side of transistor $Q_1$ of the amplitude limiter/amplifier, the input to the frequency discriminator 4 will change similar to the collector voltage as in FIG. 4 to make it possible to obtain the maximum signal-demodulated output at $f_{io}=f_o$.

There are various full-wave rectifier circuits and amplitude limiters available for practical applications. It is apparent that the device of the invention as in FIG. 1 is readily applicable to these known rectifiers and amplitude limiters.

FIG. 6 shows a characteristic of the frequency discriminator being different from that shown in FIG. 2. The waveform 11 is the output characteristic of the frequency discriminator corresponding to the input intermediate center frequency $f_{io}$. The gradient $dV/df_{io}$ corresponds to the sensitivity of the frequency discriminator. It is assumed that the non-linear distortion is minimum at the point where $V$ is equal to $V_o$ on the waveform 11. Then the characteristic as indicated by 13 in FIG. 7 can be obtained when the output of the frequency discriminator 4 is passed through the low-pass filter 6, centering the reference voltage $V_o$ and its d-c component is full-wave-rectified. The voltage $V_2$ thus obtained is applied to the amplitude limiter 9 and controlled in the foregoing manner whereby the signal-demodulated output is obtained at the maximum sensitivity and minimum distortion under the condition $V_2 = V_o$.

As has been described above, the device of this invention no doubt facilitates tuning for minimizing the non-linear distortion of the frequency discriminator attributable to the deviation in tuning of FM receivers and dispenses with the need for costly meters which have hitherto been indispensable in the prior art.

We claim:

1. In an FM receiver of the type having an amplitude limiter in the stage prior to the frequency discriminator;

an output control device comprising:

a. a low-pass filter connected to the output circuit of said frequency discriminator and operated for deriving only the d-c component from the output of said discriminator; and b. means connected between the output circuit of the low-pass filter and the amplitude limiter and operated for full-wave rectifying the output of said low-pass filter;

wherein the amplitude limiting level of said amplitude limiter is changed in a reversely proportional manner by the use of the d-c output of said frequency discriminator.

2. A circuit comprising:

first means having a signal input for limiting the amplitude of a signal applied thereto;

a frequency discriminator coupled to the output of said first means and having an output terminal connected thereto;

a low pass filter connected to the output of said frequency discriminator;

second means, connected to the output of said low pass filter, for subjecting the output of said low pass filter to full wave rectification and limiting the amplitude of the rectified output; and third means, connected between the output of said second means and said first means for controlling the level at which said first means limits the amplitude of the signal applied thereto.

3. A circuit according to claim 2, wherein said low pass filter is a filter for providing only the d-c component of the output of said frequency discriminator.

4. A circuit according to claim 2, further including an intermediate frequency band-pass filter and an intermediate frequency amplifier serially connected to the input of said first means for supplying the input signal thereto.

5. A circuit according to claim 3, further including a transformer for coupling said first means to said frequency discriminator.

6. A circuit according to claim 2, wherein said second means comprises a first transistor circuit having a pair of transistors, the emitters of which are connected in common to a first source of reference potential, the base of one of said pair of transistors being connected to said low pass filter and the base of the other of said pair of transistors being connected to a second source of reference potential, the collectors of each of said transistors being connected through respective diodes to an amplifying transistor circuit the output of which is connected to said first means.

7. A circuit according to claim 6, wherein said low pass filter is a filter for providing only the d-c component of the output of said frequency discriminator.

8. A circuit according to claim 7, further including an intermediate frequency band-pass filter and an intermediate frequency amplifier serially connected to the input of said first means for supplying the input signal thereto.

9. A circuit according to claim 8, further including a transformer for coupling said first means to said frequency discriminator.

* * * * *